(12) United States Patent
Noro

(10) Patent No.: US 9,274,831 B2
(45) Date of Patent: Mar. 1, 2016

(54) INFORMATION PROCESSING APPARATUS, INFORMATION PROCESSING METHOD, AND STORAGE MEDIUM

(71) Applicant: CANON KABUSHIKI KAISHA, Tokyo (JP)

(72) Inventor: Hideo Noro, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 435 days.

(21) Appl. No.: 13/684,353

(22) Filed: Nov. 23, 2012

(65) Prior Publication Data

US 2013/0145373 A1    Jun. 6, 2013

(30) Foreign Application Priority Data

Dec. 1, 2011    (JP) ................................ 2011-264112

(51) Int. Cl.
*G06F 9/30*    (2006.01)
*G06F 9/38*    (2006.01)
*G06F 9/48*    (2006.01)

(52) U.S. Cl.
CPC .......... *G06F 9/4881* (2013.01); *G06F 9/30087* (2013.01); *G06F 9/3889* (2013.01)

(58) Field of Classification Search
None
See application file for complete search history.

(56) References Cited

U.S. PATENT DOCUMENTS

| 6,029,190 | A  | * | 2/2000  | Oliver ........................... 718/107 |
| 2005/0240733 | A1 | * | 10/2005 | Luick ............................ 711/137 |
| 2009/0138670 | A1 | * | 5/2009  | Mutlu et al. .................. 711/167 |
| 2010/0268912 | A1 | * | 10/2010 | Conte et al. ..................... 712/20 |

FOREIGN PATENT DOCUMENTS

JP    3311381 B    8/2002

* cited by examiner

*Primary Examiner* — Emerson Puente
*Assistant Examiner* — Jonathan R Labud
(74) *Attorney, Agent, or Firm* — Fitzpatrick, Cella, Harper & Scinto

(57) ABSTRACT

There is provided with an information processing apparatus for controlling execution of a plurality of threads which run on a plurality of calculation cores connected to a memory including a plurality of banks. A first selection unit is configured to select a thread as a continuing thread which receives data from other thread, out of threads which process a data group of interest, wherein the number of accesses for a bank associated with the selected thread is less than a predetermined count. A second selection unit is configured to select a thread as a transmitting thread which transmits data to the continuing thread, out of the threads which process the data group of interest.

8 Claims, 15 Drawing Sheets

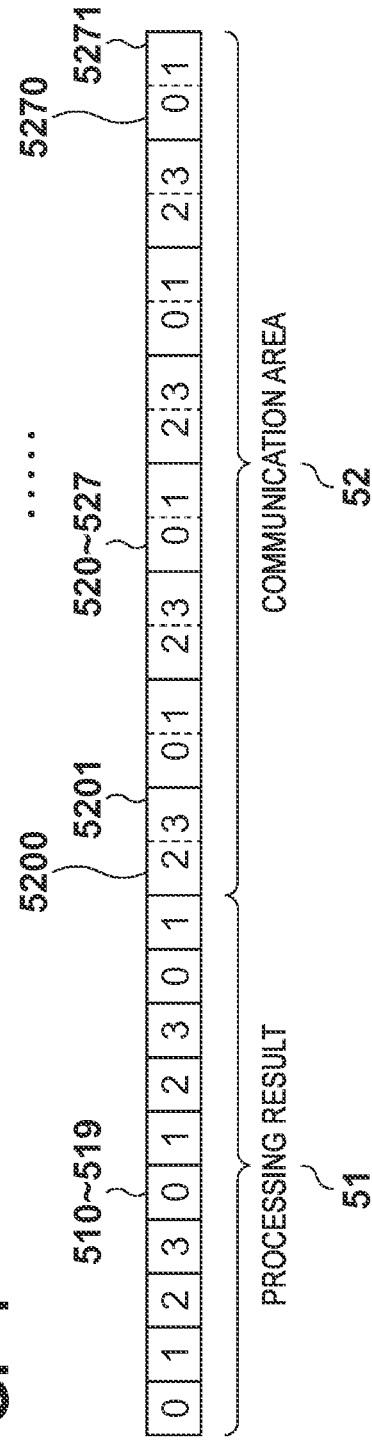

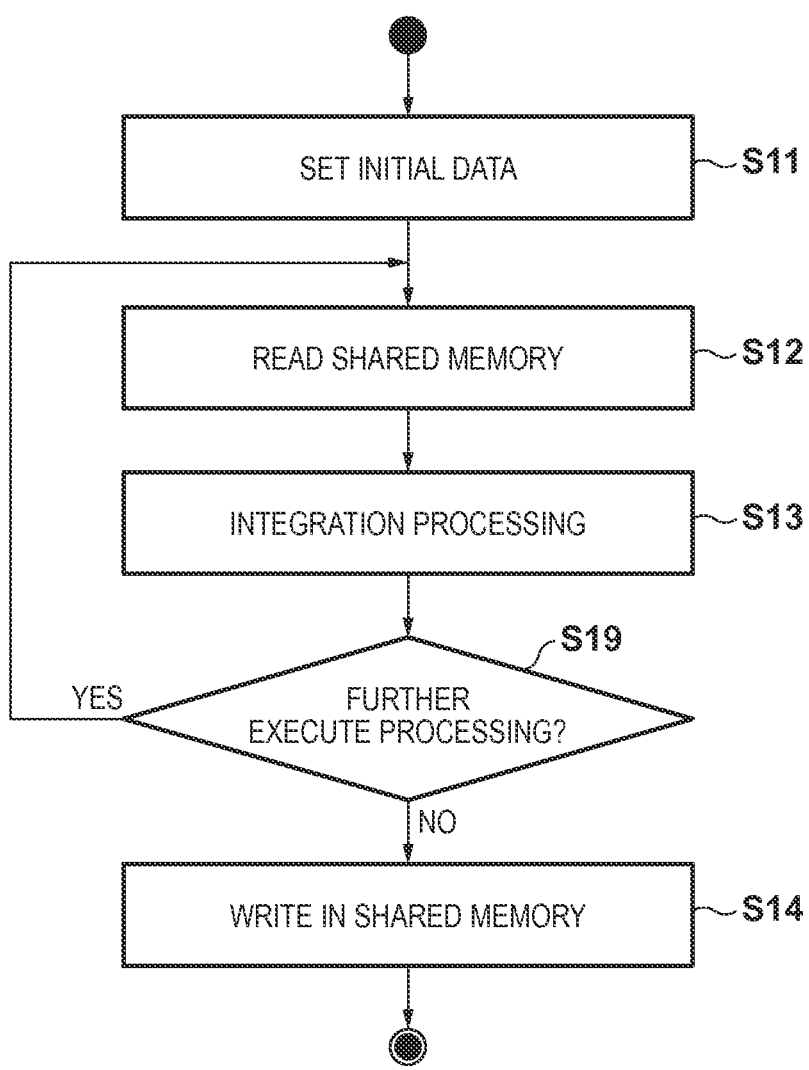

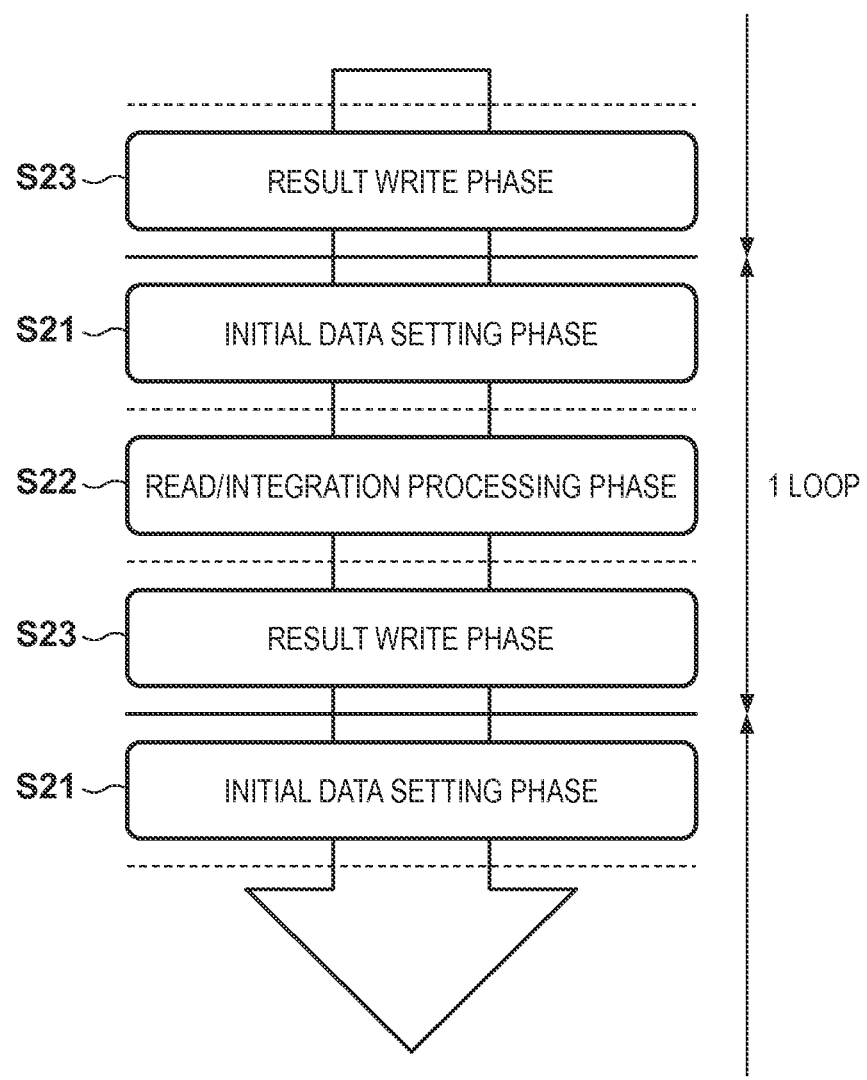

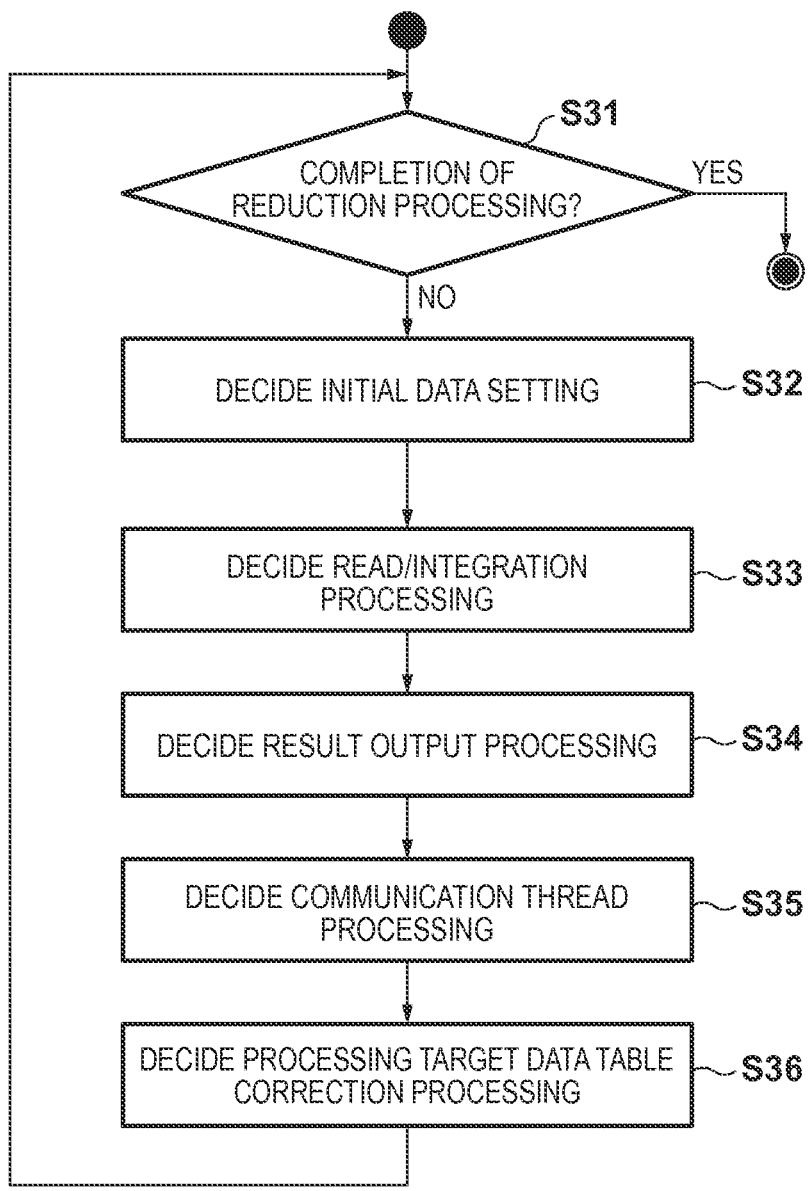

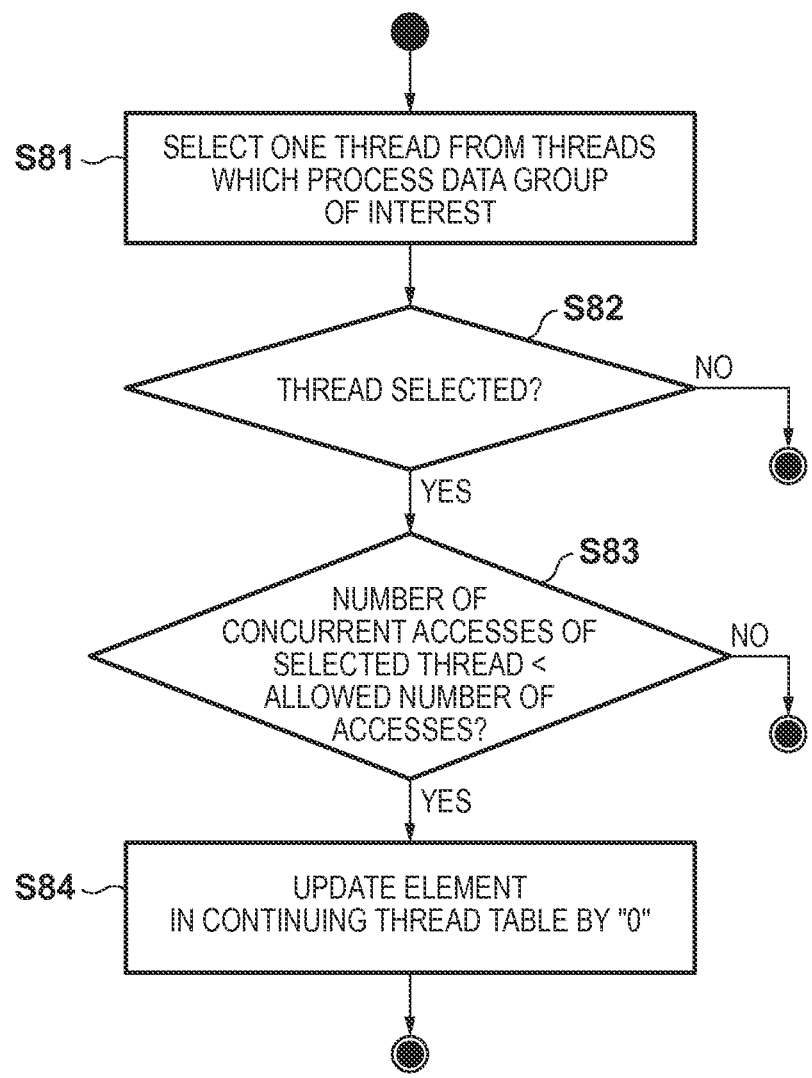

INFORMATION PROCESSING APPARATUS, INFORMATION PROCESSING METHOD, AND STORAGE MEDIUM

BACKGROUND OF THE INVENTION

1. Field of the Invention

The present invention relates to an information processing apparatus, information processing method, and storage medium, which generate instructions for parallel computers for executing reduction processing.

2. Description of the Related Art

In recent years, an approach for improving the processing performance of a computer using a plurality of CPU cores has been made. Especially, a GPGPU (General Purpose Graphics Processing Unit) or GPU (Graphics Processing Unit) computing for controlling a GPU to execute processing other than graphics processing attracts a lot of attention. A GPU has several ten to 1000 or more calculation cores, and the peak performance when all the calculation cores operate is very high. However, in order to exert the high performance of the GPU, a programming technique different from the conventional technique is required. The following description will be given taking CUDA available from NVIDIA Corporation as an example of the GPGPU. Since the CUDA is described in NVIDIA CUDA™ NVIDIA CUDA C Programming Guide Version 3.1.1 Jul. 21, 2010, a detailed description thereof will not be given.

The GPGPU normally operates in an SPMD (Single Program-Multiple Data) manner. Therefore, a single program (kernel) is concurrently executed in respective threads. The calculation performance of the GPGPU is further improved by controlling a larger number of calculation cores to restlessly continue processing. Most of applications require processing for integrating calculation results of respective threads into one after the parallel processing. As popular processing, parallel reduction processing is known. In the parallel reduction processing, a plurality of data are gradually integrated to obtain a processing result. At this time, as the data are integrated, the number of threads which join the parallel reduction processing gradually decreases. That is, since the number of threads which do nothing (idle cores) increases, the processing resources are wasted. An example of the parallel reduction is described in detail in "CUDA Technical Training Volume II: CUDA Case Studies Q2 2008", and a description thereof will not be given.

Furthermore, in the parallel reduction processing, interthread communications take place. When these communications are made via a shared memory, since a plurality of threads concurrently make communications, access conflicts occur. Since conflicting accesses are processed in turn, and other accesses are waited until processing is complete, a processing speed lowers considerably.

Japanese Patent No. 3311381 discloses a method of compiling a program which runs on a computer including a plurality of calculation units that can operate in parallel. According to the method of Japanese Patent No. 3311381, when the number of registers to be used, which is estimated upon issuance of a certain instruction, is larger than the number of available registers, that instruction is changed to another instruction so as to reduce the number of concurrently active registers.

However, the technique described in Japanese Patent No. 3311381 does not consider any case in which a plurality of cores operate in the SPMD manner like in the GPGPU. That is, according to the technique described in Japanese Patent No. 3311381, a plurality of cores are instructed to operate according to different instructions. However, in the GPGPU which does not perform such operations, the operation speed rather lowers according to the technique of Japanese Patent No. 3311381.

SUMMARY OF THE INVENTION

The present invention provides a technique for increasing a calculation speed by increasing a utilization factor of calculation cores while reducing memory access conflicts in a system in which a plurality of threads execute calculations while communicating with each other.

According to one aspect of the present invention, an information processing apparatus for controlling execution of a plurality of threads which run on a plurality of calculation cores connected to a memory including a plurality of banks comprises: a holding unit configured to hold the numbers of accesses by respective threads in a single calculation cycle for respective banks; a first selection unit configured to select a thread as a continuing thread which receives data from other thread, out of threads which process a data group of interest, wherein the number of accesses for a bank associated with the selected thread is less than a predetermined count; a second selection unit configured to select a thread as a transmitting thread which transmits data to the continuing thread, out of the threads which process the data group of interest; a generation unit configured to generate an instruction which instructs the transmitting thread to write data in an area in a bank associated with the continuing thread, and an instruction which instructs the continuing thread to read data from the area in the bank associated with the continuing thread; and an update unit configured to increment the number of accesses to the bank associated with the continuing thread when the generation unit generates an instruction.

According to another aspect of the present invention, an information processing method for controlling execution of a plurality of threads which run on a plurality of calculation cores connected to a memory including a plurality of banks, in view of the numbers of accesses by respective threads in a single calculation cycle for respective banks, comprises the steps of: selecting a thread as a continuing thread which receives data from other thread, out of threads which process a data group of interest, wherein the number of accesses for a bank associated with the selected thread is less than a predetermined count; selecting a thread as a transmitting thread which transmits data to the continuing thread, out of the threads which process the data group of interest; generating an instruction which instructs the transmitting thread to write data in an area in a bank associated with the continuing thread, and an instruction which instructs the continuing thread to read data from the area in the bank associated with the continuing thread; and incrementing the number of accesses to the bank associated with the continuing thread when the instruction is generated in the generating step.

Further features of the present invention will become apparent from the following description of exemplary embodiments (with reference to the attached drawings).

BRIEF DESCRIPTION OF THE DRAWINGS

FIG. 3 is a view for explaining the system which operates using the result of the embodiment;

FIG. 4 is a view for explaining the system which operates using the result of the embodiment;

FIG. 5 is a flowchart for explaining the system which operates using the result of the embodiment;

FIG. 6 is a chart for explaining a scheduling method according to the embodiment;

FIG. 8 is a flowchart for explaining the operation of the embodiment;

FIG. 14 is a flowchart for explaining the operation of the embodiment;

DESCRIPTION OF THE EMBODIMENTS

An embodiment of the present invention will be described hereinafter with reference to the drawings. However, the scope of the present invention is not limited by the following embodiment.

[Embodiment]

Figure 1:
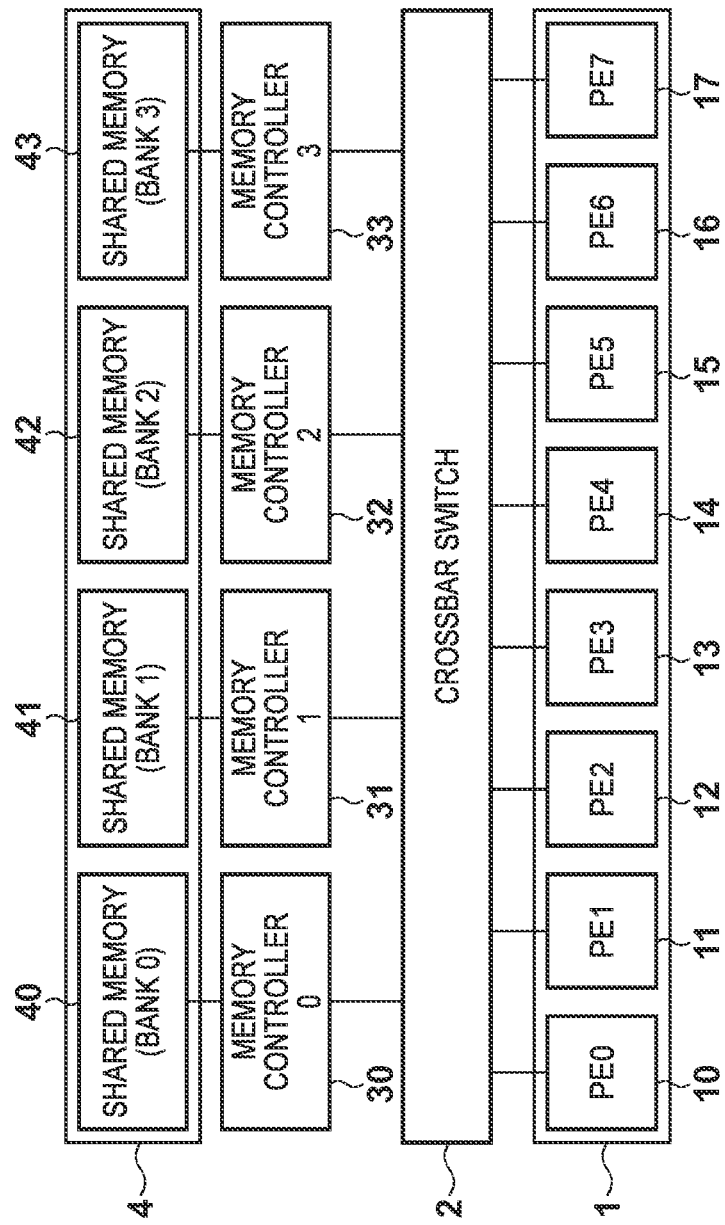
FIG. 1 is a block diagram showing an example of the arrangement of a system which operates using a result of an embodiment.

FIG. 1 shows an example of the arrangement of a system which executes parallel reduction processing. The system shown in FIG. 1 executes processing according to a schedule determined by an information processing apparatus according to this embodiment, as will be described in detail below. A calculation unit 1 includes a plurality of processing elements PE (calculation cores). In the example of FIG. 1, the calculation unit 1 includes eight processing elements, which will be respectively referred to as PE0 (10) to PE7 (17) hereinafter. The respective processing elements PE can access a shared memory 4 via a crossbar switch 2.

The shared memory 4 is divided into a plurality of banks, which are connected to the crossbar switch 2 via different memory controllers. In the example of FIG. 1, the shared memory 4 is divided into four banks, which will be respectively referred to as bank 0 (40) to bank 3 (43) hereinafter. The system shown in FIG. 1 includes memory controllers respectively corresponding to the banks 0 to 3, and these memory controllers will be referred to as memory controller 0 (30) to memory controller 3 (33) hereinafter.

The respective processing elements PE included in the calculation unit 1 often concurrently issue access requests to the shared memory 4. When access requests are issued to different banks, the calculation unit 1 can access the shared memory 4 without any delay. However, when access requests are concurrently issued to an identical bank (this will be referred to as a bank conflict hereinafter), the memory controller requires a certain time period to process these access requests. A processing delay caused by the bank conflicts is prolonged as the number of access requests to an identical memory controller is larger.

Figure 2:
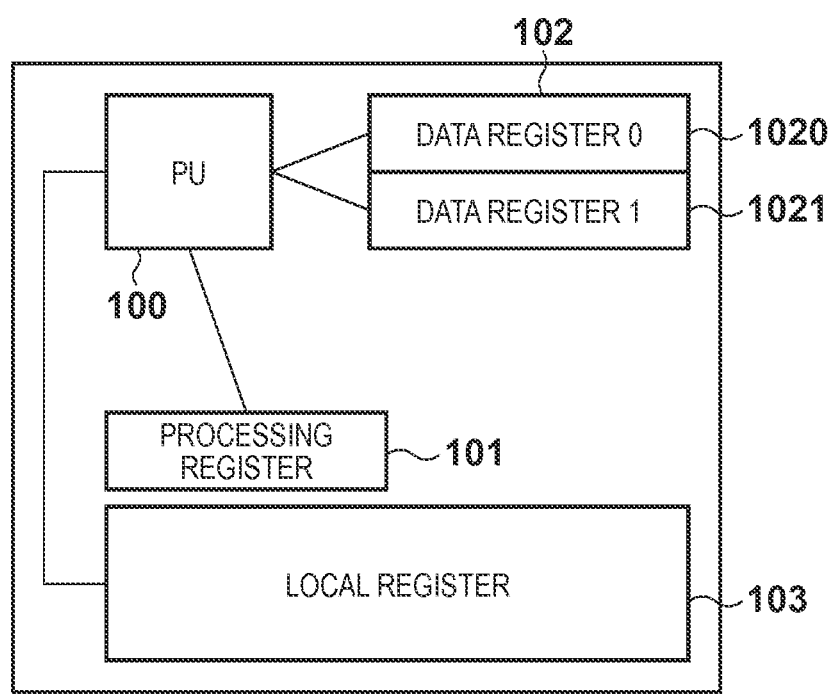
FIG. 2 is a block diagram for explaining the system which operates using the result of the embodiment.

FIG. 2 shows an example of the arrangement of one of the processing elements (PE0 (10) to PE7 (17)) in more detail. A processing unit PU 100 executes every calculation. When viewed from processing software, a thread which is a subject of a processing operation seems as if it were running on this processing unit PU 100. Note that in the following description, a thread which runs on the processing unit PU 100 in a processing element PEn will be referred to as a thread n. That is, threads which respectively run on the processing elements PE0 to PE7 will be referred to as threads 0 to 7 hereinafter. In this embodiment, all the threads execute the same line of a single program. For this reason, some threads execute unnecessary processing. In such case, processing results of these threads are discarded by a mask register (not shown).

Reduction processing is executed by repeating processing for calculating one data from a plurality of data by the processing element. This processing will be referred to as integration processing in this specification. For example, by repeating integration of two out of a large number of data, a single processing result (calculation processing result) can be obtained from the large number of data. Examples of the integration processing include addition of a plurality of data, calculations of a maximum value of a plurality of data, calculations of a minimum value of a plurality of data, and the like. Of course, other integration processes may be adopted in this embodiment. In the reduction processing, selection of some data from a large number of data and integration of the selected data are repeated. In this case, independently of data to be selected first, the same result is normally obtained.

In the integration processing, the PU 100 calculates using a value in a processing register 101 and that in a data register 102, and writes back a calculation result to the processing register 101. The data register 102 can include one or more registers. In the example of FIG. 2, the data register 102 has a data register 0 (1020) and data register 1 (1021). Also, before the beginning of the reduction processing, a local register 103 of each processing element stores initial data in advance. This initial data may be read from a storage medium (not shown) onto the local register 103 before the beginning of the reduction processing. In this embodiment, the processing element PE has the two data registers 1020 and 1021. However, the number of data registers included in the processing element PE may be one or three or more.

FIG. 3 shows how to map memory areas of the shared memory 4 on the banks. In FIG. 3, first, second, third, and fourth data are respectively mapped on banks 0, 1, 2, and 3. Also, fifth to eighth data are also mapped on banks 0 to 3, respectively.

FIG. 4 shows an assignment example of memory areas with respect to data stored in the shared memory 4. Each square represents one area which stores data, and a number written in each square is that of a mapped bank. That is, when each individual memory area is to be accessed, an access to a bank indicated by the corresponding number is made. In this embodiment, assume that the reduction processing is executed for each of 10 initial data groups. That is, respective data included in one initial data group are stored in the respective processing elements PE. In this embodiment, one initial data group includes eight initial data, and respective initial data are stored in the local registers 103 of the respective processing elements PE. Needless to say, the number of initial data included in one initial data group need not always match the number of processing elements PE.

Each processing element PE executes the reduction processing for one initial data group, and obtains a processing result. Likewise, each processing element PE stores data included in the remaining nine initial data groups. Then, each processing element PE executes the reduction processing for the remaining nine initial data groups, and obtains nine processing results. The reduction processing results obtained in this manner are output to a result output area 51 in the shared memory. The result output area 51 has 10 areas 510 to 519 corresponding to 10 groups, and 10 output results are stored in turn from a first area.

The shared memory 4 includes a communication area 52. This communication area 52 is used for interthread communications. Communication areas are assigned (associated) to respective threads in advance. More specifically, communication areas 520 to 527 are respectively assigned to threads 0 to 7. Then, threads 0 to 7 are configured to read data in the communication areas 520 to 527 respectively assigned to them.

Each of the communication areas 520 to 527 has data areas corresponding to the data registers 1020 and 1021. In this embodiment, since one processing element PE has the two data registers 1020 and 1021, each of the communication areas 520 to 527 has two data areas. More specifically, the communication area 520 has data areas 5200 and 5201, and the communication area 527 has data areas 5270 and 5271. Each data register is configured to read data in the corresponding data area.

For example, a communication from the thread 3 to the thread 2 will be practically described below. The thread 3 writes data in a data area 5220 or 5221. Next, the thread 2 writes data in the data area 5220 or 5221 in the data register 1020 or 1021. In this case, data in the data area 5220 is read onto the data register 0 (1020), and that in the data area 5221 is read onto the data register 1 (1021). In this manner, the data areas which store data to be read by the respective data registers are fixedly determined in advance.

FIG. 5 is a flowchart showing the integration processing executed by one thread which runs on the processing unit PU 100 in the parallel reduction processing. In this case, this one thread will be referred to as a thread A. In step S11, the thread A reads initial data in the local register 103 onto the processing register 101. When reduction target data is sent from another thread, the thread A reads data from the communication area 52 onto the data register 0 or 1 (1020 or 1021) in step S12. In step S13, the thread A executes the integration processing of the data in the processing register 101 and that in the data register 0 or 1 (1020 or 1021). For example, when a maximum value is to be calculated as the integration processing, if a value in the processing register 101 is "3" and that in the data register 0 (1020) is "5", "5" is obtained as a processing result. Then, the thread A writes back the obtained processing result to the processing register 101. In this example, the value in the processing register 101 is updated to "5" by the integration processing. Note that when initial data is read out from the local register 103 and the readout value is passed to another thread without executing the integration processing, processes of steps S12 and S13 are skipped.

The thread A checks in step S19 whether or not to further execute the reduction processing. For example, when reduction target data is sent from another thread, the reduction processing can be executed using the sent data. If the reduction processing is further executed, the process returns to step S12. If the processing result is to be written in the shared memory 4 without further executing the reduction processing, the process advances to step S14.

In step S14, the thread A writes the value in the processing register 101 in the shared memory 4. For example, when the processing result is passed to another thread, the thread A writes the value in the processing register 101 in a data area for a partner thread in the communication area 52. If the reduction processing for one initial data group is complete, the thread A writes the value in the processing register 101 in the corresponding area (one of areas 510 to 519) in the result output area 51.

In the parallel reduction processing, the number of repetition times of steps S12 and S13 is different for each individual thread. Therefore, when a certain thread is about to execute step S12, another thread may be about to execute step S14. However, as described above, in this embodiment, the respective threads are configured to execute the same instruction at the same time. Therefore, when different threads are to execute different steps in this manner, a large penalty may be given to the execution speed.

In this embodiment, as shown in FIG. 6, the integration processing for one loop is divided into three phases, that is, an initial data setting phase (step S21, a read cycle), a read/integration processing phase (step S22, a calculation cycle), and a result write phase (step S23, a write cycle). Then, an information processing apparatus according to this embodiment schedules so that respective threads designated by an instruction start respective phases in synchronism with each other. Upon comparison between FIGS. 5 and 6, step S21 corresponds to step S11, step S22 corresponds to steps S12 and S13, and step S23 corresponds to step S14. By repeating these phases, the reduction processing result is written in the memory.

According to this embodiment, scheduling is done so that when a certain thread executes the read/integration processing phase S22 (step S12 of reading the shared memory and step S13 of the integration processing), another thread executes the read/integration processing phase S22. Since a processing result of a thread which need not execute the read/integration processing phase S22 is discarded by the mask register, such thread does not substantially execute any processing (idle state). According to the method of this embodiment, an idle state time may be seemingly increased. However, when a plurality of threads are to concurrently execute different processes, during processing of one thread, the other thread is set in an idle state, and vice versa. Therefore, an idle state time is rather increased in such a case. For this reason, by controlling a plurality of threads to synchronously execute the same processing, it is expected that an idle state time is decreased, and more efficient processing can be implemented.

Interthread communications are made via the communication area 52 on the shared memory 4, and reduction results are written in the result output area 51. In this case, when a plurality of threads concurrently access a single bank of the shared memory 4, bank conflicts occur, thus causing a considerable penalty in terms of speed. Hence, in this embodiment, the number of concurrent accesses to a bank is controlled to be equal to or smaller than an allowable limit count (to be referred to as the allowed number of accesses hereinafter). In the following description, "the number of bank conflicts=the number of concurrent accesses−1", and "the allowed number of bank conflicts=the allowed number of accesses−1".

A scheduling system 6 as an information processing apparatus according to this embodiment sequentially generates instructions for respective threads, thereby scheduling operations of the respective threads. The scheduling system 6 may or may not be connected to the execution environment shown in FIG. 1. For example, the scheduling system 6 independent of the execution environment may execute processing to be described below to generate instructions for the respective threads.

A generated instruction is output to an instruction output buffer 61. The instruction can be output in the form of a program (for example, a source code of the CUDA) in the execution environment. The output instruction may be input to the execution environment shown in FIG. 1 via, for example, a storage medium. Then, each thread executes an operation according to the output instruction. In this manner, the operations of the respective threads are scheduled. It is advantageous to execute the scheduling processing in advance in terms of improvement of the execution speed.

Alternatively, the instruction output to the instruction output buffer 61 may be directly accessed by the execution environment shown in FIG. 1. In this case, the instruction output buffer 61 may be included in each individual processing element PE (in each individual thread). Then, each individual thread operates according to a value stored in the corresponding instruction output buffer 61. In this manner, the operations of the respective threads are scheduled.

Figure 17:
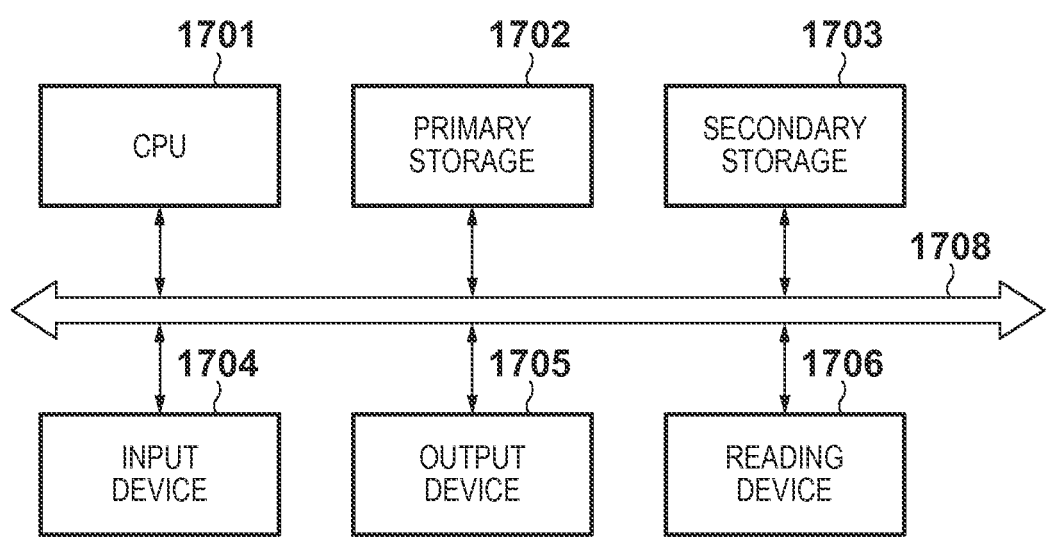
FIG. 17 is a block diagram showing an example of a computer which can execute the operation of the embodiment.

Such scheduling system 6 can also be implemented by, for example, a normal computer. FIG. 17 shows the basic arrangement of such computer. In order to execute functions of the scheduling system 6 shown in FIG. 7 by this computer, respective functional modules may be expressed by a program, and the computer may read these modules. In this manner, this computer can implement all the functions of the scheduling system 6. In this case, units shown in FIG. 7 and the like can function as functions or subroutines executed by a CPU.

A computer program is normally stored in a computer-readable storage medium such as a CD-ROM. This storage medium is set in a reading device (CD-ROM drive or the like) to copy or install the program in a system, thus allowing to execute the program. Therefore, such computer-readable storage medium is included in the scope of the present invention.

Referring to FIG. 17, a CPU 1701 controls operations of the overall computer. For example, the CPU 1701 executes a program stored in a primary storage 1702. The primary storage 1702 is mainly a memory such as a RAM, and reads and stores a program and the like stored in a secondary storage 1703. The secondary storage 1703 corresponds to, for example, a hard disk, CD-ROM, or the like. The program is stored in the secondary storage 1703, and is read onto the primary storage 1702 when it is executed. Then, the CPU 1701 executes the execution processing. An input device 1704 is a device required to input information to the computer, and corresponds to, for example, a mouse, keyboard, and the like. Using the input device 1704, the user may input information to the computer. An output device 1705 is a device required for the computer to output information, and includes a monitor and printer. A reading device 1706 is a device required to acquire external information. The reading device 1706 includes a memory card reader and network card. A bus 1708 interconnects the aforementioned units and allows them to exchange data.

Figure 7:
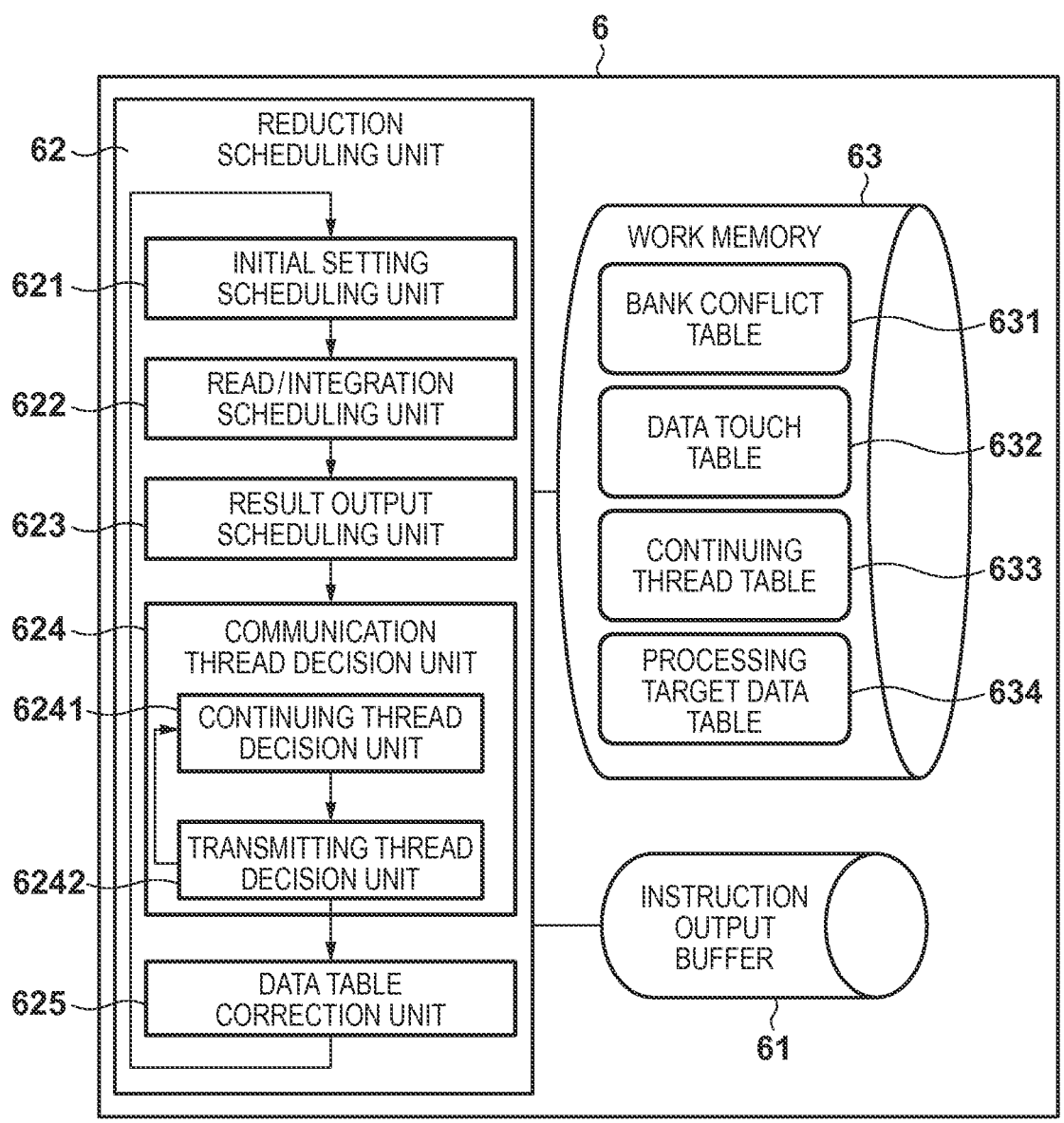
FIG. 7 is a block diagram showing the arrangement of a system to which the embodiment is applied.

FIG. 7 shows an example of the arrangement of the scheduling system 6 which generates instructions for the processing elements PE using a scheduling method according to this embodiment. The scheduling system 6 writes an instruction in the instruction output buffer 61 by executing the following processing. Note that upon development of a program which runs on a GPGPU, it is a common practice to code single processing using identical codes. However, know-how required to write such program has already been known, and a description thereof will not be given in this specification.

The reduction processing of this embodiment will be described in more detail below with reference to FIG. 7. In this embodiment, the reduction processing is executed for each of 10 initial data groups, as described above. In the following description, respective initial data groups (data groups) will be referred to as data 0, data 1, . . . , data 9.

A reduction scheduling unit 62 writes an instruction in the instruction output buffer 61 with reference to a work memory 63. FIG. 8 shows the sequence of processing executed by the reduction scheduling unit 62. The reduction scheduling unit 62 checks in step S31 whether or not the reduction processing is complete for all the data groups. If the reduction processing is complete, the processing of the reduction scheduling unit 62 ends. If the reduction processing is not complete yet, the reduction scheduling unit 62 executes the following reduction processing for one loop (steps S32 to S36).

In step S32, the reduction scheduling unit 62 executes scheduling of the initial data setting phase S21. In step S33, the reduction scheduling unit 62 executes scheduling of the read/integration processing phase S22. In steps S34 and S35, the reduction scheduling unit 62 executes scheduling of the result write phase S23. The reduction scheduling unit 62 executes these scheduling processes while simulating resource use statuses including the number of bank conflicts of the shared memory 4, on the work memory 63. In step S36, the reduction scheduling unit 62 updates a processing target data table 634 prior to the scheduling processes of the next loop. FIGS. 9A to 9D show examples of data tables indicating resource use statuses simulated on the work memory 63. These processes will be described in more detail below with reference to FIGS. 9A to 9D.

In step S32, an initial setting scheduling unit 621 of the reduction scheduling unit 62 executes scheduling of the initial data setting phase S21. In this embodiment, the scheduling is executed in turn for all the threads, that is, threads 0 to 7. As a practical example, the initial setting scheduling unit 621 writes an instruction for the thread 0 in the instruction output buffer 61. After that, the initial setting scheduling unit 621 sequentially writes instructions in the instruction output buffer 61 also for the threads 1 to 7. In this way, the initial setting scheduling unit 621 can execute scheduling.

Figure 10B:
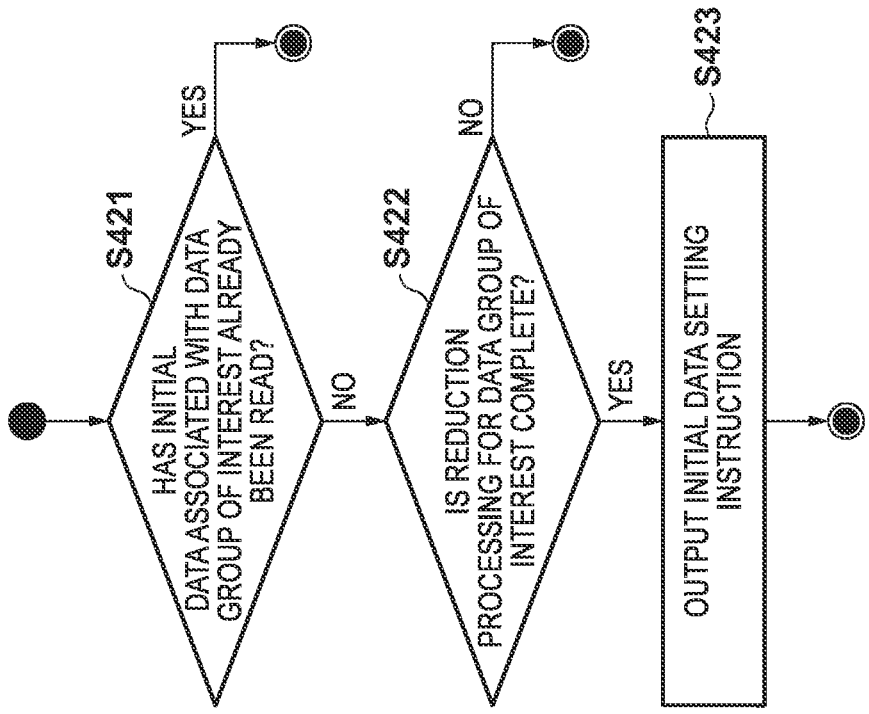
FIGS. 10A and 10B are flowcharts for explaining the operation of the embodiment.
Figure 10A:
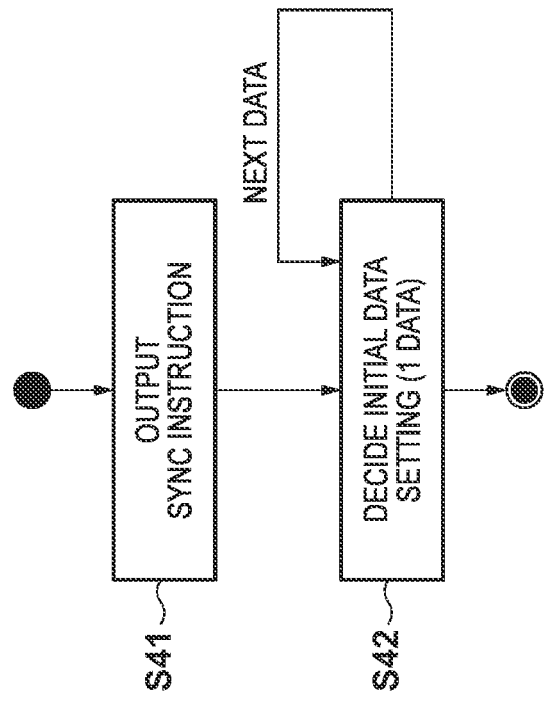

FIG. 10A is a detailed flowchart of step S32. In step S32, the processing shown in FIG. 10A is executed for each of the threads 0 to 7, and the same processing is executed for the respective threads. The processing for the thread 0 will be described below.

In step S41, the initial setting scheduling unit 621 outputs a sync instruction to the instruction output buffer 61. Based on the sync instruction, respective threads can synchronously execute the initial data setting phase S21. As the sync instruction, for example, an instruction_syncthreads ( ) is prepared in the CUDA.

In step S42, the initial setting scheduling unit 621 schedules reading of data from the local register 103 onto the processing register 101. More specifically, the initial setting scheduling unit 621 selects data 0 to 9 as a data group of interest in turn. Then, the initial setting scheduling unit 621 determines whether or not initial data of the data group of interest is to be read from the local register 103 onto the processing register 101.

FIG. 10B is a flowchart showing more detailed processing of step S42. The initial setting scheduling unit 621 checks in step S421 whether or not the thread 0 is scheduled to process data which belongs to any data group. This checking process can be attained with reference to the processing target data table 634 (for example, FIG. 9A).

The processing target data table 634 is an array having elements as many as the number of threads (eight elements in this embodiment). Each element indicates a data group as a processing target of each thread. Each element is initialized by a value "F" indicating invalidity. When the scheduling system 6 generates an instruction which instructs a certain thread to read initial data of a certain data group, a numerical value indicating that data group is set in an element corresponding to that thread. For example, referring to FIG. 9A, a numerical value "1" is written in an element corresponding to a thread for which an instruction for reading initial data of group 1 is generated. On the other hand, when the scheduling system 6 generates an instruction which instructs a certain thread to complete the reduction processing of a certain data group, an element corresponding to that thread is initialized by "F" again. For example, when the scheduling system 6 generates an instruction which instructs a certain thread to output data in the processing register 101, an element corresponding to that thread is initialized by "F" again.

More specifically, if an element corresponding to the data group of interest is not "F" in the processing target data table 634, it can be determined that the thread 0 is scheduled to process data which belongs to any data group. In such case, the initial setting scheduling unit 621 ends scheduling for the data group of interest, and selects the next data group as the data group of interest, thus executing the processing in FIG. 10B.

On the other hand, if the element corresponding to the thread 0 is "F" in the processing target data table 634, the process advances to step S422. In this case, the thread 0 is not scheduled to process data. Thus, the initial setting scheduling unit 621 then checks whether or not to generate an instruction which instructs the thread 0 to read initial data which belongs to the data group of interest. More specifically, the initial setting scheduling unit 621 checks in step S422 whether or not it has already generated the instruction which instructs the thread 0 to read initial data which belongs to the data group of interest. The process of step S422 can be executed with reference to a data touch table 632 (for example, FIG. 9B).

The data touch table 632 is a two-dimensional array including elements as many as the number of threads×the number of data groups (8×10 in this embodiment), and respective elements are initialized by "F" in advance. Each element corresponds to a thread and data group. When an instruction which instructs a certain thread to read initial data which belongs to a certain data group is generated, "T" is set in a corresponding element.

If "T" is set in an element corresponding to the thread 0 and the data group of interest, the initial setting scheduling unit 621 determines that the instruction which instructs the thread 0 to read initial data which belongs to the data group of interest has already been generated. In such case, the initial setting scheduling unit 621 ends scheduling for the data group of interest, and selects the next data group as the data group of interest, thus executing the processing in FIG. 10B.

On the other hand, if "F" is set in the element corresponding to the thread 0 and the data group of interest, it can be determined that an instruction which instructs the thread 0 to read initial data which belongs to the data group of interest has not been generated yet. In this case, the process advances to step S423. In step S423, the initial setting scheduling unit 621 writes an instruction which instructs the thread 0 to read initial data of the data group of interest from the local register 103 onto the processing register 101 in the instruction output buffer 61. Furthermore, the initial setting scheduling unit 621 updates the element corresponding to the thread 0 and the data group of interest in the data touch table 632 by "T". Moreover, the initial setting scheduling unit 621 sets the number indicating the data group of interest in an element corresponding to the thread 0 in the processing target data table 634.

By executing the aforementioned processing in FIG. 10A respectively for the threads 0 to 7, the processing of the initial data setting phase S21 is complete.

In step S33, a read/integration scheduling unit 622 of the reduction scheduling unit 62 executes scheduling of the read/integration processing phase S22. In step S33, the read/integration scheduling unit 622 executes scheduling in turn for all threads, that is, threads 0 to 7 as in step S32. FIG. 11A is a detailed flowchart of step S33. In step S33, as in step S32, the processing shown in FIG. 11A is executed for each of the threads 0 to 7, and the same processing is executed for respective threads. The processing for the thread 0 will be described below.

In step S51, the read/integration scheduling unit 622 outputs a sync instruction to the instruction output buffer 61 as in step S41.

In step S52, the read/integration scheduling unit 622 schedules the reading processing of data from the communication area 52 and integration processing of data.

Figure 11B:
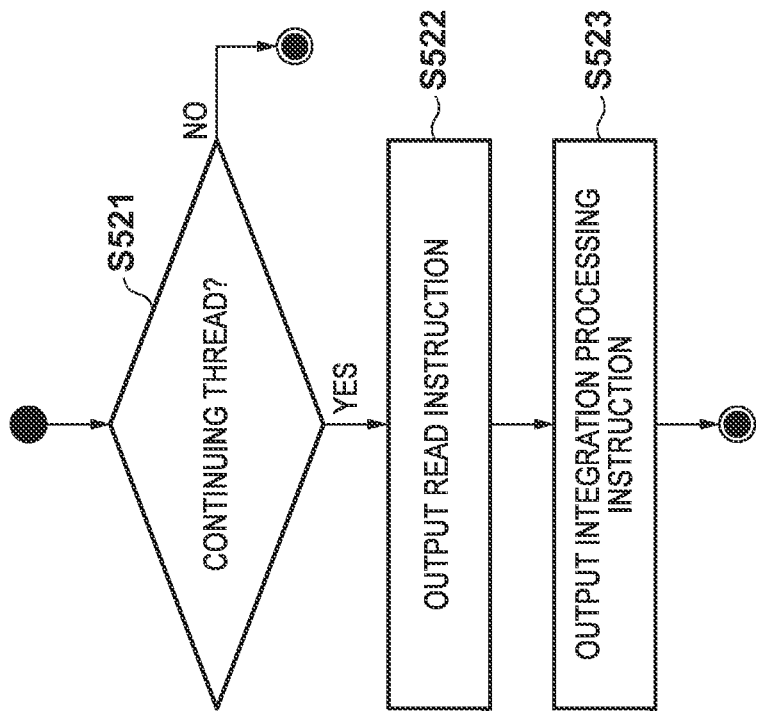
FIGS. 11A and 11B are flowcharts for explaining the operation of the embodiment.
Figure 11A:
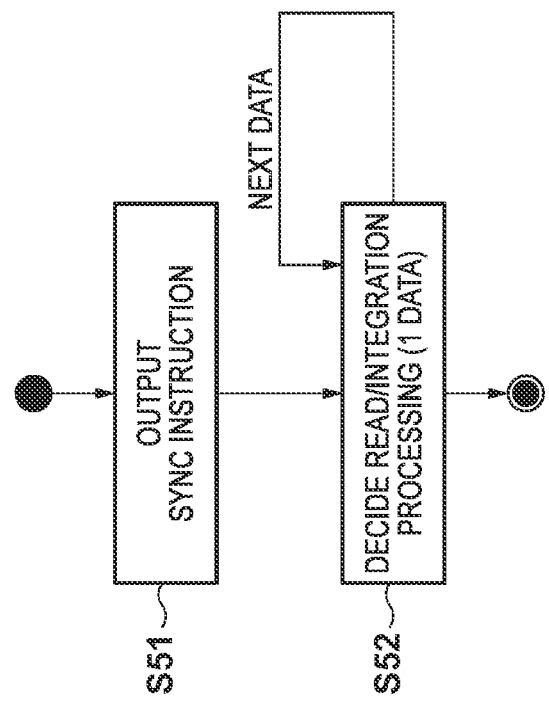

FIG. 11B is a flowchart showing more detailed processing of step S52. The read/integration scheduling unit 622 checks in step S521 whether or not the thread 0 is a continuing thread. This checking process can be attained with reference to a continuing thread table 633 (for example, FIG. 9C).

The continuing thread (continuing calculation core) is a thread which was instructed in the previous result write phase S23 not to output the value of the processing register 101 to the communication area 52 in the next result write phase S23. The continuing thread reads communication data from another thread and executes integration processing in the read/integration processing phase S22 (however, the thread does not read data in some cases). In this embodiment, a communication thread decision unit 624 (to be described later) checks if each thread is a continuing thread.

The continuing thread table is an array having elements as many as the number of threads (eight elements in this embodiment), and indicates the number of threads from which data is sent to each thread. That is, a minimum value of each element of the continuing thread table is "0", and a maximum value is the number of data registers ("2" in this embodiment) in each processing element PE. An element corresponding to a thread which is not a continuing thread has a value "F".

In this manner, if an element corresponding to the thread 0 in the continuing thread table is "F", the read/integration scheduling unit 622 can determine that the thread 0 is not a continuing thread. If it is determined in step S521 that the thread 0 is not a continuing thread, the scheduling processing for the thread 0 ends, and the read/integration scheduling unit 622 executes the processing shown in FIG. 11A for the next thread.

If it is determined in step S521 that the thread 0 is a continuing thread, the process advances to step S522. In step S522, the read/integration scheduling unit 622 outputs an instruction indicating that "data is read from the communication area 52 onto the data register 102" to the instruction output buffer 61. The number of data read from the communication area by each individual thread is stored in an element corresponding to that thread in the continuing thread table.

In this embodiment, if an element corresponding to the thread 0 in the continuing thread table is "1", the read/integration scheduling unit 622 generates an instruction which instructs the thread 0 to read a value in the data area 5200 onto the data register 0. If the element corresponding to the thread 0 in the continuing thread table is "2", the read/integration scheduling unit 622 generates an instruction which instructs the thread 0 to read a value in the data area 5200 onto the data register 0. If the element corresponding to the thread 0 in the continuing thread table is "2", the read/integration scheduling unit 622 further generates an instruction which instructs the thread 0 to read a value in the data area 5201 onto the data register 1.

As described above, in this embodiment, when a value indicated by an element corresponding to each thread in the continuing thread table is smaller than the number of data registers 102, an instruction which instructs to read data as many as the number indicated by the element from the communication area is generated. In this case, the read/integration scheduling unit 622 generates an instruction which instructs to preferentially read data at a preceding position. However, in another embodiment, when an element in the continuing thread table is not "F", the read/integration scheduling unit 622 may generate an instruction which instructs to read values from the communication area 52 onto all the data registers 102.

In step S523, the read/integration scheduling unit 622 outputs an instruction indicating that "integration processing is executed between the processing register 101 and each data register 102" to the instruction output buffer 61. This integration processing is executed in turn between the processing register 101 and respective data registers 102. Upon reception of this instruction, a thread executes the integration processing between the processing register 101 and data register 0 (1020) first, and writes a result in the processing register 101. Furthermore, this thread executes the integration processing between the processing register 101 and data register 1 (1021), and writes a result in the processing register 101.

This integration processing suffices to be repeated as many as the number of values read onto the data register 102 in step S522. For example, when a value is read onto only the data register 1020, that is, when an element corresponding to the thread 0 in the continuing thread table is "1", the integration processing need only be executed between the processing register 101 and data register 0 (1020).

However, when such a branch processing is executed according to the number of values read onto the data register 102, a longer execution time is rather required depending on the execution environment. Hence, in this embodiment, the read/integration scheduling unit 622 outputs an instruction indicating that "data of the data register 102 which need not undergo the integration processing is rewritten" to the instruction output buffer 61 between steps S522 and S523. In this case, the read/integration scheduling unit 622 need only rewrite a value of the data register 102 to a value which does not influence a result even after the integration processing.

As a practical example, when addition of respective elements is executed as the integration processing, and an element corresponding to the thread 0 in the continuing thread table is "1", the read/integration scheduling unit 622 can output an instruction indicating that ""0" is set in the data register 1 (1021)". The same applies to calculations of a maximum value as the integration processing. By executing such processing, the read/integration scheduling unit 622 need only simply output an instruction for executing the integration processing between the processing register 101 and all the data registers 102 in step S523. In this case, the conditional branch processing can be skipped at the execution timing.

In steps S34 and S35, a result output scheduling unit 623 and communication thread decision unit 624 of the reduction scheduling unit 62 execute scheduling of the result write phase S23. In the result write phase S23, each thread outputs a reduction result to the result output area 51 or transmits data to another thread. In this embodiment, a write access is made to the shared memory 4 in either case. Therefore, these operations can be executed based on a single code. Also, one thread never executes both the operations in the single result write phase S23. Therefore, in this embodiment, each individual thread is scheduled to output the reduction result to the result output area 51, to transmit data to another thread, or to be set in an idle state in the single result output phase S23.

If it is difficult to execute the output operation of the reduction result to the result output area 51 and the transmitting operation of data to another thread based on a single code, these operations can be executed in different phases. For example, such difficulty may occur when memory write sequences are largely different between these operations. In this case, except that a sync instruction is output at the beginning of each phase, the scheduling processing can be executed in the same manner as in this embodiment to be described below.

Step S34 for scheduling output of the reduction processing result to the result output area 51 will be described first. At the beginning of step S34, the result output scheduling unit 623 initializes a bank conflict table 631 and the continuing thread table 633. More specifically, the result output scheduling unit 623 stores a value "0" in respective elements of the bank conflict table 631. Also, the result output scheduling unit 623 stores a value "F" in respective elements of the continuing thread table 633.

In step S34, as in step S32, the result output scheduling unit 623 executes scheduling in turn for all the threads, that is, threads 0 to 7. FIG. 12A is a detailed flowchart of step S34. In step S34, the processing shown in FIG. 12A is executed for each of the threads 0 to 7, and the same processing is executed for respective threads as in step S32. The processing for the thread 0 will be described below.

In step S61, the result output scheduling unit 623 outputs a sync instruction to the instruction output buffer 61 as in step S41. The result output scheduling unit 623 checks in step S62 whether or not data stored in the processing register 101 of the thread 0 is to be output to the result output area 51.

Figure 12B:
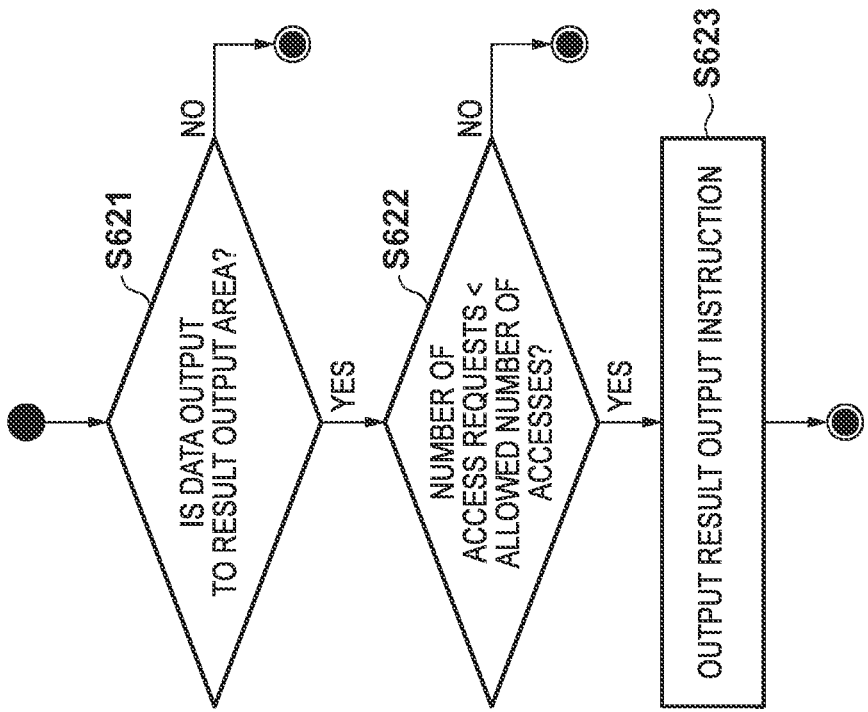
FIGS. 12A and 12B are flowcharts for explaining the operation of the embodiment.
Figure 12A:
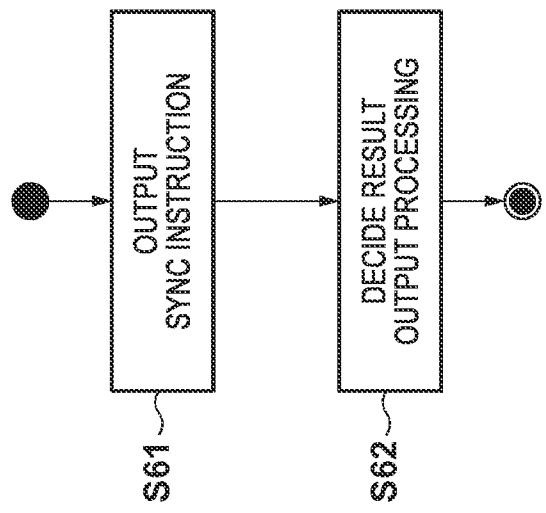

FIG. 12B is a flowchart showing more detailed processing of step S62. The result output scheduling unit 623 checks in step S621 whether or not data stored in the processing register 101 by the thread 0 is to be output to the result output area 51. If data stored in the processing register 101 is a final processing result of each data group, this data is output to the result output area 51.

This checking process can be attained with reference to, for example, the data touch table 632 and processing target data table 634. Assume that a data group processed by the thread 0 is a data group of interest. When processing for the data group of interest has been started by the predetermined number of threads, and only the thread 0 currently processes the data group of interest, data stored in the processing register 101 by the thread 0 is output to the result output area 51. In this case, the predetermined number normally matches the number of threads which have initial data that belong to the data group of interest in their local registers 103.

When the processing for the data group of interest has been started by the predetermined number of threads, the number of elements "T" corresponding to the data group of interest in the data touch table matches the predetermined number. In this embodiment, since 10 threads respectively process respective data groups, when the number of elements "T" corresponding to the data group of interest is 10, it can be determined that the processing for the data group of interest has been started by the predetermined number of threads. Also, when the number of elements having a value corresponding to the data group of interest in the processing target data table 634 is one, it can be determined that a thread which currently processes the data group of interest is only the thread 0.

If data stored in the processing register 101 by the thread 0 is not output to the result output area 51, the process of step S62 ends, and the processing shown in FIG. 12A is executed for the next thread. If data stored in the processing register 101 in the thread 0 is to be output to the result output area 51, the process advances to step S622. In step S622, the result output scheduling unit 623 confirms the number of access requests (the number of accesses) to a bank in which the processing result of the data group of interest is to be written. In this embodiment, as described above, an upper limit of the number of threads (the allowed number of accesses) which can concurrently access an identical bank is determined in advance, and scheduling is executed according to this upper limit.

Figure 9B:
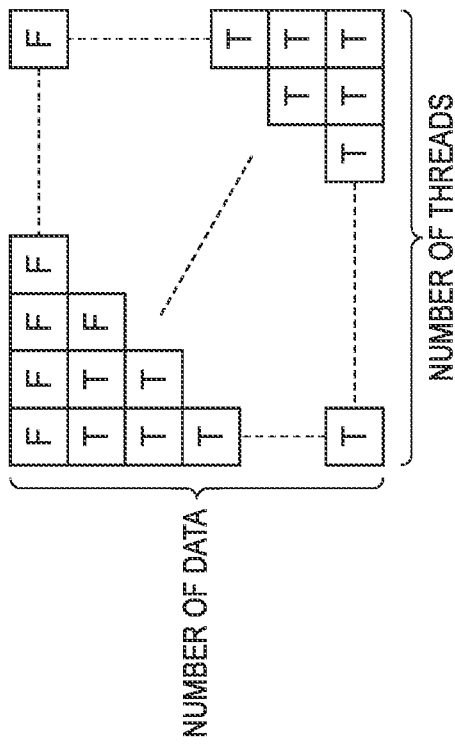
FIGS. 9A to 9D show examples of data tables used in the embodiment.
Figure 9A:
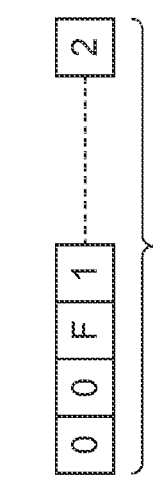
Figure 9D:
Figure 9C:
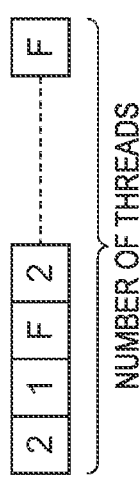

The number of access requests to each bank (management information) is managed and held by a bank conflict table 631 (for example, FIG. 9D). The bank conflict table 631 is an array having elements as many as the number of banks (four elements in this embodiment). Respective elements of the bank conflict table 631 are initialized to zero in advance. Then, every time the result output scheduling unit 623 schedules an access to each bank, a value of an element corresponding to that bank is incremented by 1.

Then, the result output scheduling unit 623 confirms whether or not the number of access requests to a bank in which the processing result of the data group of interest is to be written is less than the allowed number of accesses (less than a predetermined access count), which is determined in advance. If the number of access requests is less than the allowed number of accesses, the process advances to step S623. If the number of access requests is equal to or larger than the allowed number of accesses, the processing shown in FIG. 12A for the thread 0 ends. That is, an instruction which instructs the thread 0 to write the result in the result output area 51 is not generated in the current result write phase S23, and is generated in the next or subsequent result write phase S23.

In step S623, the result output scheduling unit 623 outputs an instruction indicating that "the value in the processing register 101 is written in an area corresponding to the data group of interest in the result output area 51" to the instruction output buffer 61 in association with the thread 0. Furthermore, the result output scheduling unit 623 increments, by 1, a value of an element of the bank conflict table 631 corresponding to a bank in which the processing result of the data group of interest is to be written.

The processing of the communication thread decision unit 624 in step S35 in which data is transmitted to another thread will be described below. In step S35, the communication thread decision unit 624 executes the following processing in place of scheduling in turn for the threads 0 to 7.

Figure 13B:
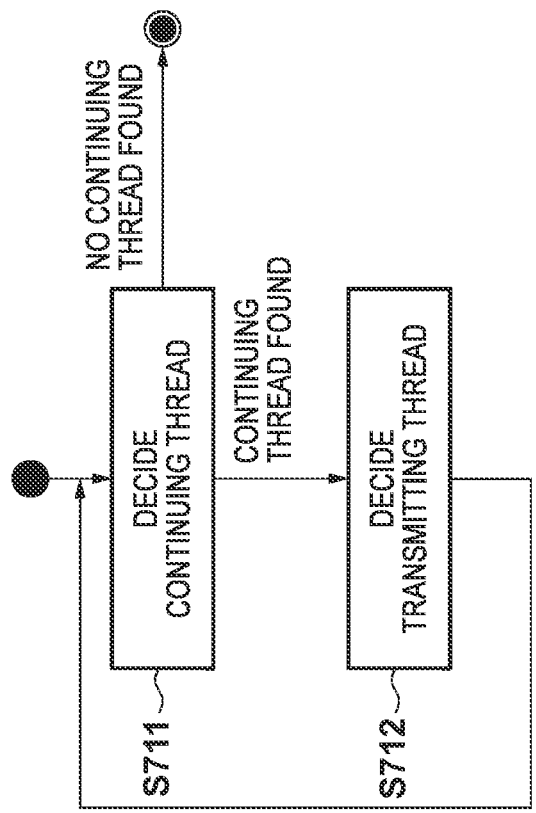
FIGS. 13A and 13B are flowcharts for explaining the operation of the embodiment.
Figure 13A:
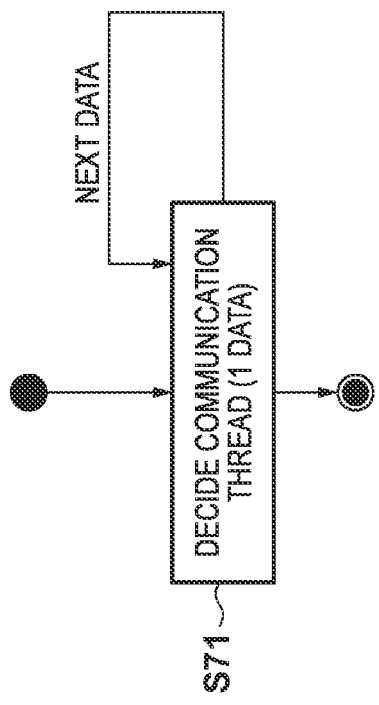

FIG. 13A is a detailed flowchart of step S35. In step S71, the communication thread decision unit 624 decides a thread which transmits data (transmitting thread, transmitting calculation core) and that which receives data (continuing thread) for each of all the data groups. In this embodiment, the communication thread decision unit 624 selects in turn data 0 to 9 as a data group of interest, and decides a transmitting thread and continuing thread in association with the data group of interest.

FIG. 13B is a detailed flowchart of step S71. In step S711, a continuing thread decision unit 6241 of the communication thread decision unit 624 selects one continuing thread (first selection). If no continuing thread is found, the processing shown in FIG. 13B for the data group of interest ends, and is executed for the next data group of interest. In step S712, a transmitting thread decision unit 6242 of the communication thread decision unit 624 determines a transmitting thread which transmits data to the continuing thread selected in step S711 (second selection). By repeating steps S711 and S712, a set of a continuing thread and transmitting tread which exchange data in a set of the result write phase and subsequent read/integration processing phase are repetitively selected.

FIG. 14 is a flowchart showing step S711 in more detail. In step S81, the continuing thread decision unit 6241 selects one of the threads which process the data group of interest. In this step, the continuing thread decision unit 6241 selects a thread, so that the number of concurrent accesses to a bank to which data area, in the communication area 52, corresponding to the selected thread belongs, is the smallest.

A thread which currently processes the data group of interest can be determined with reference to the processing target data table 634. For example, the continuing thread decision unit 6241 can check whether or not a value of an element corresponding to each thread in the processing target data table 634 matches the number of the data group of interest. If they match, that thread currently processes the data group of interest.

Also, the continuing thread decision unit 6241 can determine the number of concurrent accesses to each bank with reference to the bank conflict table 631. As described above, the bank conflict table 631 has the number of concurrent accesses to each individual bank as an element.

By selecting a thread so that the number of concurrent accesses to a bank to which data area corresponding to the selected thread belongs, is the smallest as in this embodiment, the numbers of concurrent accesses to respective banks can be averaged. Note that when one thread reads data from a plurality of data areas, this thread may read data from a plurality of banks. In such case, the continuing thread decision unit 6241 determines the number of concurrent accesses for each bank. Then, the continuing thread decision unit 6241 employs a maximum value of the determined numbers of concurrent accesses as the number of concurrent accesses to a bank to which a data area corresponding to a selected thread belongs. In this way, the numbers of bank conflicts of all the banks can be suppressed to be equal to or smaller than the allowed number of accesses.

The continuing thread decision unit 6241 checks in step S82 whether or not a thread is selected in step S711. If no thread is selected, the continuing thread decision unit 6241 determines that no continuing thread is required for the data group of interest. Then, the continuing thread decision unit 6241 ends the processing of FIG. 13B, and decides a transmitting thread and continuing thread for the next data group of interest.

The continuing thread decision unit 6241 checks in step S83 whether or not the number of concurrent accesses to a bank to which a corresponding data area belongs is less than the allowed number of accesses in association with the thread selected in step S711. If the number of concurrent accesses is equal to or larger than the allowed number of accesses, the continuing thread decision unit 6241 determines that another continuing thread is not selected for the data group of interest. Then, the continuing thread decision unit 6241 ends the processing of FIG. 13B, and decides a transmitting thread and continuing thread for the next data group of interest.

If the number of concurrent accesses is less than the allowed number of accesses, the continuing thread decision unit 6241 determines the thread selected in step S711 as a continuing thread. In step S84, the continuing thread decision unit 6241 updates an element corresponding to the continuing thread selected in step S711 in the continuing thread table 633 by "0". Furthermore, the continuing thread decision unit 6241 increments a value of an element associated with a bank to which a data area corresponding to the continuing thread selected in step S711 belongs (for example, adds "1") in the bank conflict table 631. In this manner, the continuing thread decision unit 6241 updates the bank conflict table 631. Then, the process advances to step S712.

Figure 15:
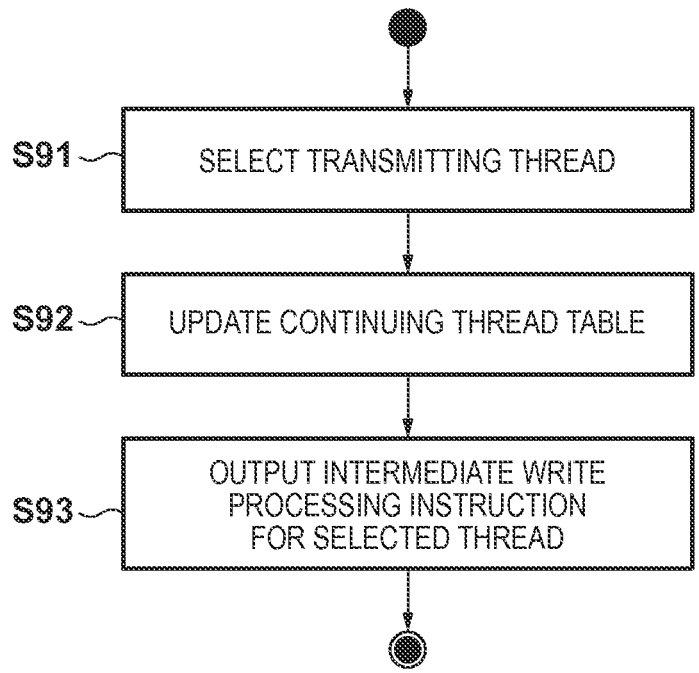
FIG. 15 is a flowchart for explaining the operation of the embodiment.

FIG. 15 is a flowchart showing step S712 in more detail. In step S91, the transmitting thread decision unit 6242 decides a transmitting thread which transmits data to the continuing thread selected in step S711. More specifically, the transmitting thread decision unit 6242 selects a thread, which is not selected as the continuing thread or transmitting thread, as a transmitting thread, of threads whose processing target is the data group of interest. Whether or not each thread is selected as a continuing thread or transmitting thread can be determined with reference to the continuing thread table 633. In this embodiment, the transmitting thread decision unit 6242 can select, as a transmitting thread, a thread, a corresponding element of which in the continuing thread table 633 is "F", and whose processing target is the data group of interest.

In this embodiment, the transmitting thread decision unit 6242 selects transmitting threads, corresponding to one continuing thread, as many as the number of data registers 102 of the continuing thread. In this case, data from the respective transmitting threads are read onto the respective data registers 102. When the number of threads whose processing target is the data group of interest and which are not selected as a continuing thread or transmitting thread is larger than the number of data registers 102, the transmitting thread decision unit 6242 can select transmitting threads as follows.

That is, the transmitting thread decision unit 6242 selects a thread so that the number of concurrent accesses to a bank to which a data area corresponding to the selected thread belongs is larger. In this embodiment, no data is written in a data area corresponding to the transmitting thread. Therefore, by selecting, as a transmitting thread, a thread so that the number of concurrent accesses to a bank to which a data area belongs the selected thread is larger (not selecting that thread as a continuing thread), the numbers of concurrent accesses to respective banks can be averaged. On the other hand, if the number of threads whose processing target is the data group of interest and which are not selected as a continuing thread or transmitting thread is smaller than the number of data registers 102 of the continuing thread, the transmitting thread decision unit 6242 can select all threads.

In step S92, the transmitting thread decision unit 6242 updates an element corresponding to the continuing thread decided in step S711 in the continuing thread table 633. More specifically, the transmitting thread decision unit 6242 stores the number of transmitting threads which transmit data to the continuing thread in the continuing thread table 633 as an element corresponding to the continuing thread.

In step S93, the transmitting thread decision unit 6242 outputs an instruction to the transmitting threads selected in step S91 to execute intermediate write processing. More specifically, the transmitting thread decision unit 6242 outputs an instruction indicating that "the respective transmitting threads copy the contents of the processing register 101 to data areas to be read by the continuing thread" to the instruction output buffer 61.

For example, when the continuing thread is the thread 0, and the transmitting threads are the threads 2 and 3, the transmitting thread decision unit 6242 outputs an instruction indicating that "the thread 2 copies the contents of the processing register 101 to the data area 5200" to the instruction output buffer 61. Also, the transmitting thread decision unit 6242 outputs an instruction indicating that "the thread 3 copies the contents of the processing register 101 to the data area 5201" to the instruction output buffer 61.

Figure 16:
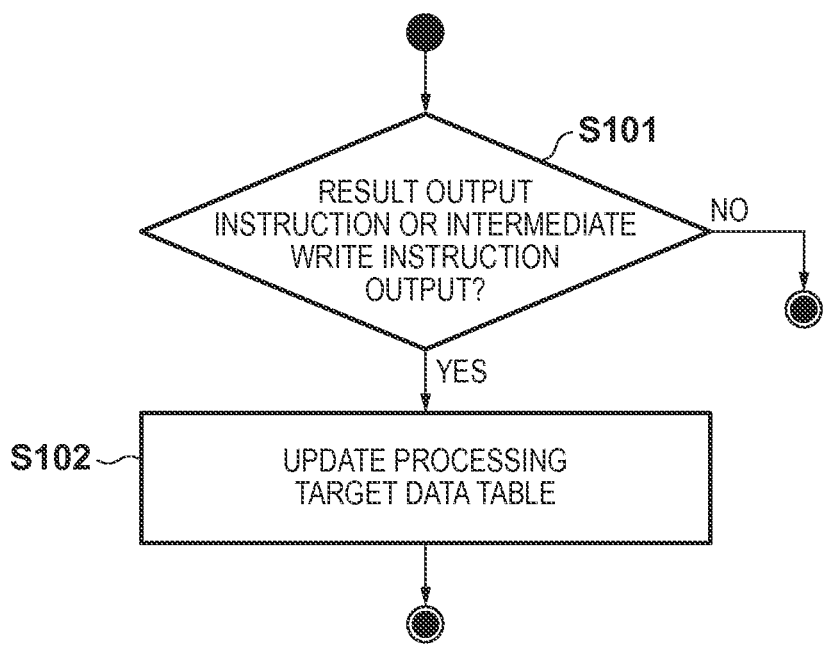
FIG. 16 is a flowchart for explaining the operation of the embodiment.

FIG. 16 is a flowchart of more detailed processing of step S36. A data table correction unit 625 checks in step S101 whether or not an instruction that instructs to output the contents of the processing register 101 to the result output area 51 is generated for any thread in step S34. Also, the data table correction unit 625 checks whether or not an instruction that instructs to output the contents of the processing register 101 to the communication area 52 is generated for any thread in step S35. If neither instruction is generated, the processing in FIG. 16 ends. If either instruction is generated, the process advances to step S102. In step S102, the data table correction unit 625 updates an element corresponding to a thread as a target of the instruction that instructs to output the contents of the processing register 101 in the processing target data table 634 by a value "F" indicating invalidity.

In the aforementioned embodiment, the number of banks of the shared memory and the number of memory controllers are 4, the number of processing elements is 8, the number of data registers in each processing element is 2, and the number of data groups which are to undergo the reduction processing is 10. However, the present invention is not limited to these numbers. In the system according to the aforementioned embodiment, a processing time varies by changing the number of data registers and the allowed number of accesses. The optimal number of data registers and the optimal allowed number of accesses are different depending on the hardware arrangement. Therefore, by appropriately selecting these values, the processing time can be further shortened.

Other Embodiments

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (for example, computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2011-264112, filed Dec. 1, 2011, which is hereby incorporated by reference herein in its entirety.

What is claimed is:

1. An information processing apparatus for controlling execution of a plurality of threads which process a plurality of data groups by running on a plurality of calculation cores connected to a memory including a plurality of banks, a dedicated data area in each bank of the memory being allocated to each of the threads, said apparatus comprising:

a holding unit configured to hold the number of access requests issued by the plurality of threads in a single calculation cycle for each of the banks;

a first selection unit configured to select, as a continuing thread which receives data from another thread, out of threads which process a data group of interest, a thread that has a dedicated data area included in a bank for which the number of access requests is less than an allowed number of accesses;

an incrementing unit configured to increment the number of access requests to the bank including the dedicated data area allocated to the continuing thread when said first selection unit selects the continuing thread;

a second selection unit configured to select, as a transmitting thread which transmits data to the continuing thread, out of the threads which process the data group of interest, a thread that has not been selected as the continuing thread or the transmitting thread; and a generation unit configured to generate a write instruction which instructs the transmitting thread to write data in the dedicated data area allocated to the continuing thread, and a read instruction which instructs the continuing thread to read data from the dedicated data area allocated to the continuing thread so that the continuing thread can receive data from the transmitting thread.

2. The apparatus according to claim 1, wherein each instruction includes, to be synchronously executed by threads designated by the instruction:

a read cycle for reading initial data onto a register held by the calculation core on which the threads run, a calculation cycle for making calculations using data read from areas in banks associated in advance with the threads and data in a register held by the calculation core, and storing a calculation result in the register held by the calculation core, and a write cycle for writing data stored in the register held by the calculation core, in the memory.

3. The apparatus according to claim 2, wherein said first selection unit and said second selection unit are further configured to repetitively select a set of the continuing thread and the transmitting thread which exchange data in a pair of the write cycle and the subsequent calculation cycle out of the plurality of threads which process the data group of interest.

4. The apparatus according to claim 2, wherein said generation unit is further configured to generate the write instruction which instructs the transmitting thread to write data in the dedicated data area allocated to the continuing thread in the write cycle, and the read instruction which instructs the continuing thread to read data from the dedicated data area allocated to the continuing thread in the calculation cycle that follows the write cycle.

5. The apparatus according to claim 1, wherein said first selection unit is further configured to select, as the continuing thread, a thread that has a dedicated data area included in a bank for which the number of access requests is smaller.

6. The apparatus according to claim 1, wherein said second selection unit is further configured to select, as the transmitting thread, a thread that has a dedicated data area included in a bank for which the number of access requests is larger.

7. An information processing method for controlling execution of a plurality of threads which process a plurality of data groups by running on a plurality of calculation cores connected to a memory including a plurality of banks, a dedicated data area in each bank of the memory being allocated to each of the threads in view of the number of access requests issued by the plurality of threads in a single calculation cycle for each of the banks, said method comprising the steps of:

selecting, as a continuing thread which receives data from another thread, out of threads which process a data group of interest, a thread that has a dedicated data area included in a bank for which the number of access requests is less than an allowed number of accesses;

selecting, as a transmitting thread which transmits data to the continuing thread, out of the threads which process the data group of interest, a thread that has not been selected as the continuing thread or the transmitting thread; and generating a write instruction which instructs the transmitting thread to write data in the dedicated data area allocated to the continuing thread, and a read instruction which instructs the continuing thread to read data from the dedicated data area allocated to the continuing thread so that the continuing thread can receive data from the transmitting thread.

8. A non-transitory computer-readable storage medium storing a computer program for controlling a computer to function as an information processing apparatus for controlling execution of a plurality of threads which process a plurality of data groups by running on a plurality of calculation cores connected to a memory including a plurality of banks, a dedicated data area in each bank of the memory being allocated to each of the threads, said computer performing functions comprising:

a holding unit configured to hold the number of access requests issued by the plurality of threads in a single calculation cycle for each of the banks;

a first selection unit configured to select, as a continuing thread which receives data from another thread, out of threads which process a data group of interest, a thread that has a dedicated data area included in a bank for which the number of access requests is less than an allowed number of accesses;

an incrementing unit configured to increment the number of access requests to the bank including the dedicated data area allocated to the continuing thread when said first selection unit selects the continuing thread;

a second selection unit configured to select, as a transmitting thread which transmits data to the continuing thread, out of the threads which process the data group of interest, a thread that has not been selected as the continuing thread or the transmitting thread; and a generation unit configured to generate a write instruction which instructs the transmitting thread to write data in the dedicated data area allocated to the continuing thread, and a read instruction which instructs the continuing thread to read data from the dedicated data area allocated to the continuing thread so that the continuing thread can receive data from the transmitting thread.

* * * * *